United States Patent [19]

Wilkinson

[11] Patent Number: 5,537,493
[45] Date of Patent: Jul. 16, 1996

[54] APPARATUS FOR COMPRESSING IMAGE DATA EMPLOYING ENTROPY ENCODING OF DATA SCANNED FROM A PLURALITY OF SPATIAL FREQUENCY BANDS

[75] Inventor: James H. Wilkinson, Tadley, United Kingdom

[73] Assignees: Sony Corporation, Tokyo, Japan; Sony United Kingdom Limited, Weybridge, England

[21] Appl. No.: 267,679

[22] Filed: Jun. 29, 1994

[30] Foreign Application Priority Data

Aug. 27, 1993 [GB] United Kingdom ................... 9317808

[51] Int. Cl.⁶ ......................................................... G06K 9/00
[52] U.S. Cl. ........................... 382/240; 382/248; 358/432
[58] Field of Search ..................................... 382/233, 240, 382/245, 246, 248; 358/261.1, 427, 432, 433; 348/398, 403, 437, 438; H04N 1/415, 7/133

[56] References Cited

U.S. PATENT DOCUMENTS

| | | | |
|---|---|---|---|
| 4,939,583 | 7/1990 | Tsuboi et al. | 358/261.1 |
| 5,021,891 | 6/1991 | Lee | 358/432 |
| 5,063,608 | 11/1991 | Siegal | 382/56 |
| 5,148,498 | 9/1992 | Resnikoff et al. | 382/54 |
| 5,315,670 | 5/1994 | Shapiro | 382/56 |
| 5,321,776 | 6/1994 | Shapiro | 382/56 |

FOREIGN PATENT DOCUMENTS

| | | | |
|---|---|---|---|
| 0570818 | 11/1993 | European Pat. Off. | H04N 7/13 |
| WO92/22166 | 12/1992 | WIPO | H04N 1/415 |
| WO93/10634 | 5/1993 | WIPO | H04N 7/13 |

OTHER PUBLICATIONS

"Entropy Coding for Wavelet Transform of Image—And Its Application for Motion Picture Coding—"; SPIE vol. 1605, visual Communications and Image Processing '91, pp. 456–466; Ohta et al.

Gharavi, "Subband Coding Algorithms for Video Applications: Videophone to HDTV–Conferencing", IEEE Trans. on Circuits and Sys. for Video Tech., vol. 1, No. 2, Jun. 1991, pp. 174'183.

*Primary Examiner*—Leo Boudreau
*Assistant Examiner*—Andrew W. Johns
*Attorney, Agent, or Firm*—William S. Frommer; Alvin Sinderbrand

[57] ABSTRACT

A data compression technique is described for use in systems employing frequency separation, such as wavelet separation, in which the sub bands (0 to 9) have different numbers of frequency component values therein. The sub bands are scanned to form a stream of data for feeding to an entropy encoder (30) in an order in which a number of samples from each sub band are taken in turn, that number being proportional to how many frequency values are in the particular sub band.

2 Claims, 6 Drawing Sheets

| 1 | 2 | 7 | 12 | 20 | 28 | 40 | 52 |
|---|---|---|----|----|----|----|----|
| 3 | 4 | 5 | 10 | 16 | 23 | 33 | 42 |
| 8 | 6 | 9 | 13 | 19 | 27 | 35 | 45 |
| 14 | 11 | 15 | 18 | 24 | 31 | 41 | 50 |
| 22 | 17 | 21 | 25 | 30 | 37 | 47 | 56 |
| 32 | 26 | 29 | 34 | 38 | 46 | 53 | 60 |
| 44 | 36 | 39 | 43 | 48 | 55 | 59 | 62 |
| 57 | 49 | 51 | 54 | 58 | 61 | 63 | 64 |

APPARATUS FOR COMPRESSING IMAGE DATA EMPLOYING ENTROPY ENCODING OF DATA SCANNED FROM A PLURALITY OF SPATIAL FREQUENCY BANDS

BACKGROUND OF THE INVENTION

1. Field of the Invention

This invention relates to the field of image data compression. More particularly, this invention relates to image data compression utilising frequency separation and entropy encoding.

2. Description of the Prior Art

British Published Patent Application GB-A-2 251 756 (Sony Broadcast & Communications Limited) describes a system using sub-band frequency separation and entropy encoding as part of a data compression process. Sub band frequency separation is used to decorrelate the video data into spatial frequency bands of uniform size within the two-dimensional spatial frequency domain. Spatial frequency component data within these bands is then subject to entropy encoding to bring about data compression.

Another video data compression system is described in IEEE Transactions on Circuits and Systems for Video Technology, Volume 1, No. 2, June 1991, pages 174 to 183, "Sub band Coding Algorithms for Video Application: Videophone to HDTV-Conferencing" by Hamid Gharavi. In contrast to the above, a video compression system is described which separates the data into sub band components in the two-dimensional spatial frequency domain of non-uniform size. This form of frequency separation is known as "logarithmic" or "wavelet" coding.

SUMMARY OF THE INVENTION

It is an object of the invention to improve the degree of compression achieved. Such improved performance could be used to increase the number of images that may be stored within a given storage capacity or alternatively store the same number of images but to a higher resolution.

Viewed from one aspect the invention provides apparatus for compressing image data, said apparatus comprising:

(i) means for frequency separating input image data into a plurality of spatial frequency bands, at least some lower spatial frequency bands containing fewer frequency component values than at least some higher spatial frequency bands;

(ii) means for scanning frequency component values from said plurality of spatial frequency bands with a repeating scan pattern to form a scanned data stream, said scan pattern being such that a number of frequency component values are read From corresponding spatial positions within each given spatial frequency band, said number being proportional to how many frequency component values are in said given spatial frequency band; and (iii) means for entropy encoding said scanned data stream to form compressed image data.

The invention recognises that when the frequency separation technique used generates spatial frequency bands containing different numbers of spatial frequency component values, then coding efficiency and compression is improved if the scan pattern for generating the scanned data stream for feeding to the entropy encoder is such that each scan through the spatial frequency bands picks up those frequency components from each spatial frequency band corresponding to the same spatial position within the image. In the case that the different spatial frequency bands contain different numbers of frequency component values (i.e. bands of different spatial resolutions), it is necessary that the number of frequency component values taken from each spatial frequency band is proportional to how many spatial frequency component values are in that band in order that all of the frequency component values for a scan will relate to the same spatial position within the image.

The advantage of scanning the data in this way stems from the observation a signal having a high entropy at a particular image position within one spatial frequency band is likely to have a high entropy at the same position within the other spatial frequency bands. Accordingly, the above mentioned scan pattern serves to collect together such areas of high entropy prior to entropy encoding and similarly collects together areas of low entropy. This leads to improved compression efficiency due, for example, to an increased probability of the earlier use of a JPEG (Joint Photographic Experts Group) type "end of block" code within scans through low entropy regions.

The means for entropy encoding can apply the same entropy encoding throughout each scan, this being particularly suitable when relative low numbers of pixel values from each band occur sequentially within the scanned data. However, it can be advantageous that said means for entropy encoding applies differing entropy encoding to frequency component values from differing spatial frequency bands. This is particularly so when relatively large numbers of pixels values from each band are gathered together.

The compressed data stream may be a continuous data stream, but it is advantageous to provide means for formatting said compressed image data into fixed size data blocks for subsequent processing on a block by block basis.

Formatting the data into fixed size data blocks and subsequently treating these on a block by block basis enables problems such as error correction and error concealment to be more readily dealt with.

The spatial positions taken within successive scan patterns may follow a raster, zig-zag or other regular pattern through the spatial frequency bands. However, it is advantageous that successive ones of said repeating scanning pattern correspond to non spatially adjacent positions within said image data.

If successive scan patterns are non spatially adjacent, then should a temporary error occur in the data stream then the effect will be spread throughout the recovered image rather than being concentrated in one point and so be less visually noticeable. Furthermore, neighbouring valid data will be more likely to be present for concealment purposes.

It is preferred that the compression system includes a quantiser for quantising said image data according to a quantisation step size that varies between spatial frequency bands.

Varying the quantisation step size between spatial frequency bands allows the quantisation step size to be matched to the relative visual significance of the differing spatial frequency bands in the reconstructed image.

With such a quantiser, compression efficiency can be improved when said repeating scan pattern moves between spatial frequency bands following increasing quantisation step size.

This improvement in compression efficiency results from the increased likelihood of the high entropy signals being concentrated towards the beginning of each scan pattern due to both the smaller quantisation step size and inherent source picture spectral density and hence increased probability of the earlier use of a code such as an end of block code.

It will be appreciated that the means for frequency separating could take many forms providing that at least some of the lower spatial frequency bands have fewer frequency component values than at least some of the higher spatial frequency bands. A situation in which this arises and to which the invention is particularly suitable is that in which said means for frequency separating performs a multistage frequency separation process in which spatial frequency bands of lower spatial frequency undergo more stages of frequency separation than spatial frequency bands of higher spatial frequency.

A refinement of the above frequency separation technique is that in which at each frequency separation stage only that spatial frequency band of lowest spatial frequency is further frequency separated.

This technique is referred to as logarithmic decimation. If the filters used in the decimation and reconstruction process exhibit the property of regularity (Wavelets and Filter Banks: Theory and Design, Vetterli and Herley, IEEE Signal Processing, September 1992), then the technique is referred to as wavelet coding.

In a preferred embodiment the arrangement is such that said image data undergoes N stages of frequency separation in a first direction and N stages of frequency separation in a second direction orthogonal to said first direction to yield 3N+1 spatial frequency bands.

A value of N=3 has been found particularly suitable for higher compression factors.

In order to preserve the overall data rate during frequency separation it is advantageous that when an input spatial frequency band undergoes a stage of frequency separation in a given direction to produce two output spatial frequency bands, said output spatial frequency bands each have half the number of frequency component values in said given direction than said input spatial frequency band.

The scanning out of the data in the manner of the invention is facilitated in embodiments having a frame store into which said frequency component values are stored by said means for frequency separating.

In combination with the frame store containing the frequency component values, the scanning order can be advantageously easily controlled with a read address generator for generating a sequence of read addresses for said frame store following said repeating scan pattern.

The entropy encoding means can take many different forms. However, particularly efficient coding is produced by a combination of run length coding and Huffman coding. The provision of the ability to generate end of block codes indicative of all of the remaining samples within that scan being zeros is also an advantage.

Viewed from a complementary aspect this invention provides apparatus for decompressing image data, said apparatus comprising:

(i) means for entropy decoding said compressed image data stream to form a scanned data stream;

(ii) means for reordering said scanned data stream from a repeating scan pattern through frequency component values into a plurality of spatial frequency bands, said scan pattern being such that a number of frequency component values are read from corresponding spatial positions within each given spatial frequency band, said number being proportional to how many frequency component values are in said given spatial frequency band; and (iii) means for frequency combining a plurality of spatial frequency bands into output image data, at least some lower spatial frequency bands containing fewer frequency component values than at least some higher spatial frequency bands.

Viewed from another aspect this invention provides a method of compressing image data, said method comprising the steps of:

(i) frequency separating input image data into a plurality of spatial frequency bands, at least some lower spatial frequency bands containing fewer frequency component values than at least some higher spatial frequency bands;

(ii) scanning frequency component values from said plurality of spatial frequency bands with a repeating scan pattern to form a scanned data stream, said scan pattern being such that a number of frequency component values are read from corresponding spatial positions within each given spatial frequency band, said number being proportional to how many frequency component values are in said given spatial frequency band; and (iii) entropy encoding said scanned data stream to form compressed image data.

Viewed from a further aspect this invention provides a method of decompressing image data, said method comprising the steps of:

(i) entropy decoding said compressed image data stream to form a scanned data stream;

(ii) reordering said scanned data stream from a repeating scan pattern through frequency component values into a plurality of spatial frequency bands, said scan pattern being such that a number of frequency component values are read from corresponding spatial positions within each given spatial frequency band, said number being proportional to how many frequency component values are in said given spatial frequency band; and (iii) frequency combining a plurality of spatial frequency bands into output image data, at least some lower spatial frequency bands containing fewer frequency component values than at least some higher spatial frequency bands.

The present invention is particularly suited for use within recording and reproducing apparatus for image data, such as, for example, digital video tape recorders.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
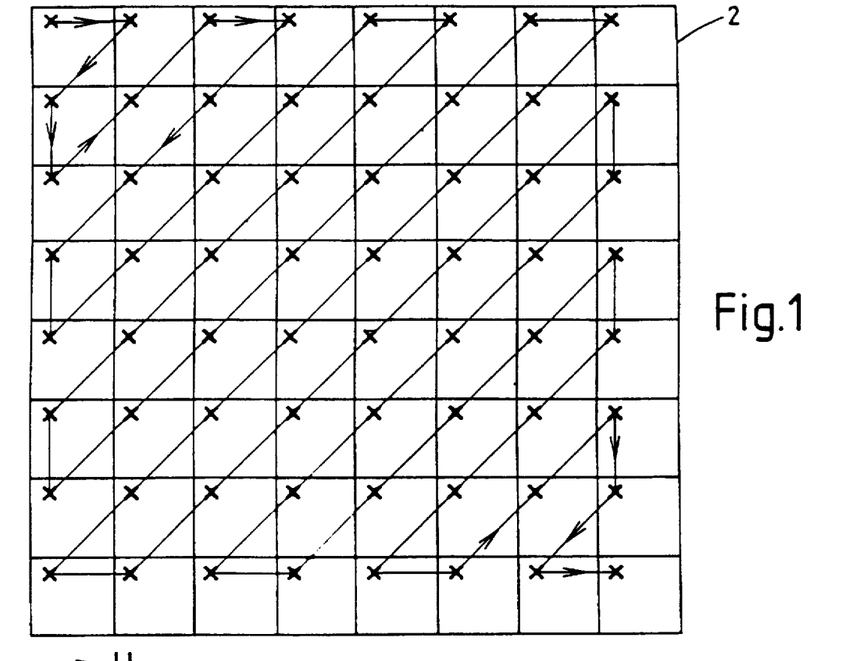
FIG. 1 illustrates an image that has been transformed into sixty four equally sized spatial frequency sub bands and a zig-zag scan performed thereon.

FIG. 1 illustrates an array 2 of sixty four equally sized spatially frequency sub bands. These sub bands may have been generated by three stages of sub band separation in both the horizontal and vertical direction. When the sub bands containing the frequency component values have been obtained, they may be scanned for subsequent processing in a zig-zag pattern as illustrated. In this pattern, the sample values from the same relative position within each sub band are collected together within each scan. The succeeding scan then moves to a different relative position within each sub band and repeats the zig-zag pattern.

Figure 2:
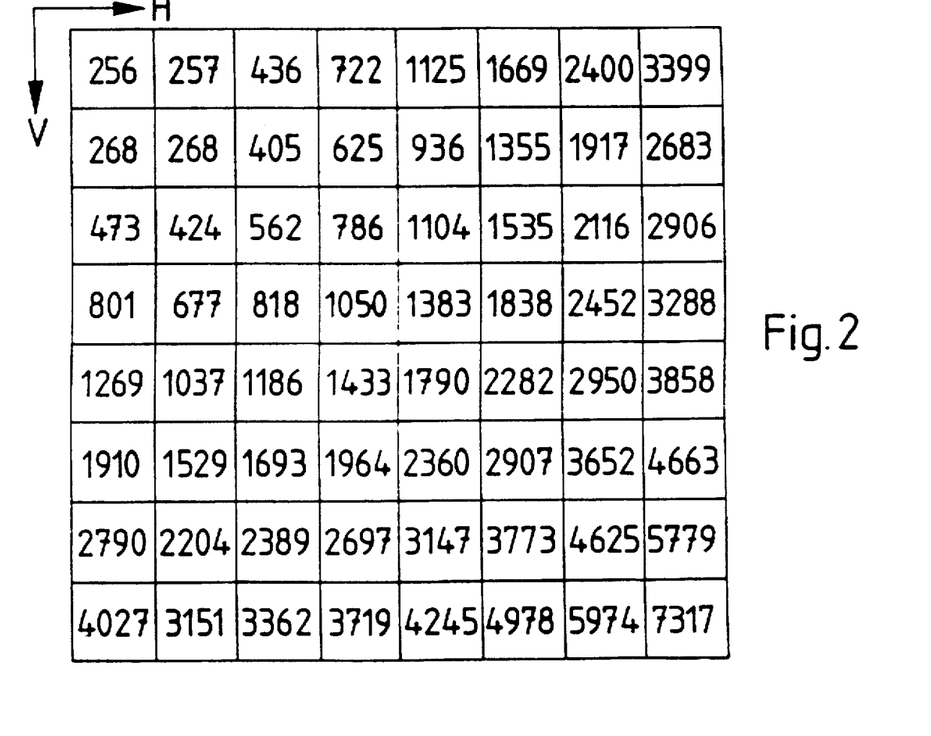
FIG. 2 illustrates a quantisation matrix for the sub band decomposition of FIG. 1.

FIG. 2 illustrates a quantisation matrix for use with the sub bands of FIG. 1. As will be seen, the quantisation step size increases with increasing horizontal frequency and increasing vertical frequency. Thus, the dc sub band is subject to a quantisation step width of 256, whereas the highest frequency sub band is subject to a quantisation step width of 7317. The more severe quantisation applied with increasing spatial frequency reflects the reducing human visual responsiveness to increasing spatial frequencies. This characteristic of human visual responsiveness means that higher spatial frequencies can be more heavily quantised without having an undue effect upon perceived image quality.

Figure 3:
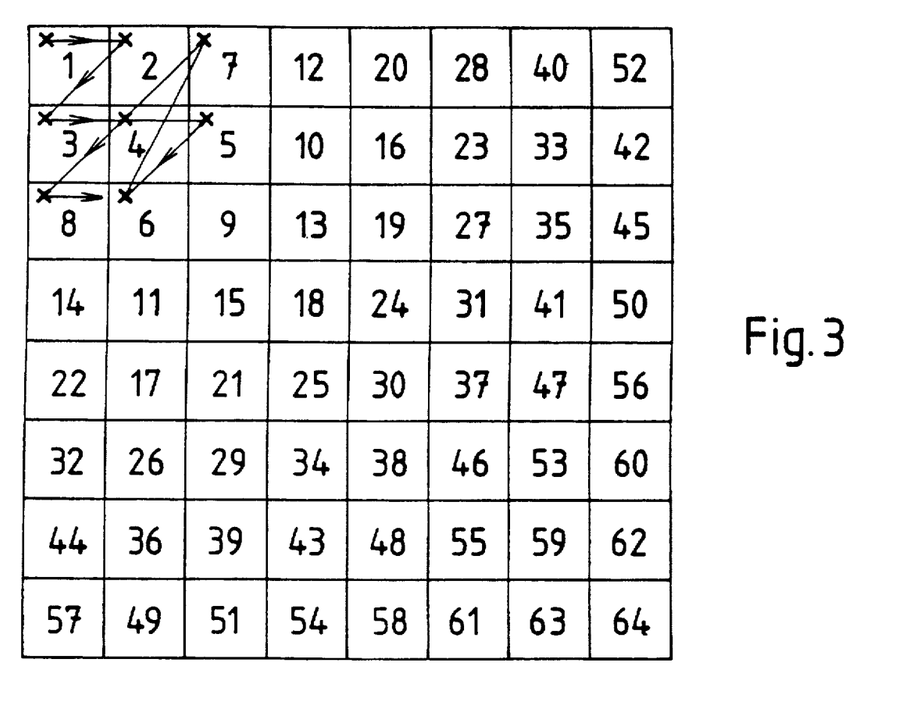
FIG. 3 illustrates a revised scanning order following the quantisation step width of FIG. 2.
Figure 4A:
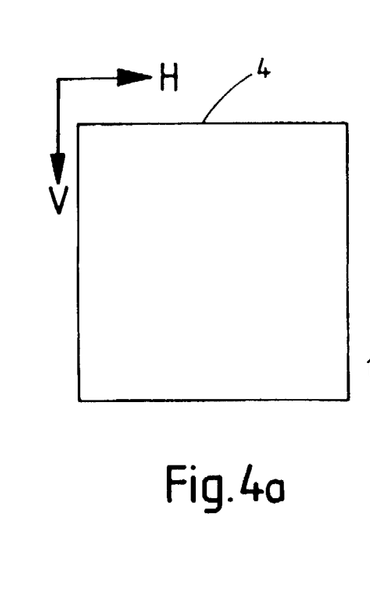
FIG. 4 schematically illustrates the process of wavelet frequency separation.
Figure 4B:
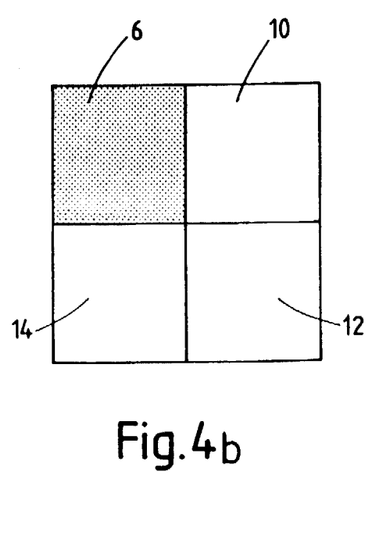
Figure 4C:
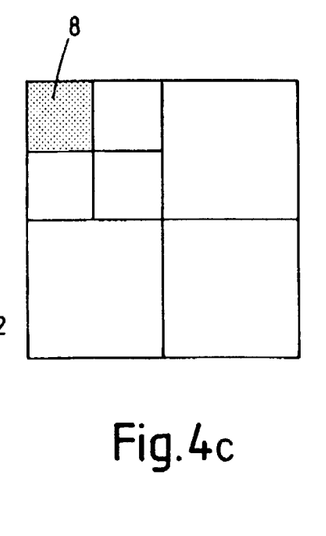
Figure 4D:
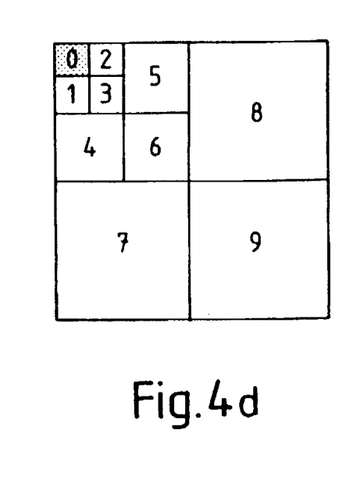

FIG. 3 illustrates a revised scan pattern for data that has been subject to quantisation by the quantisation matrix of FIG. 2. In this case, the scan pattern samples each coefficient value at a corresponding position within each sub band in an order following the increase in quantisation step width.

FIG. 4 illustrates wavelet coding of an array of original picture data 4. In the first stage of decimation the image data is separated in both the horizontal and vertical directions into the upper half of its spatial frequency, components and the lower half of its spatial frequency components. The shaded sub band 6 is the lowest horizontal and lowest vertical frequency sub band. When the spatial frequency separation occurs, the number of samples in each of the separated streams is halved; in this way, the overall data rate is preserved. Thus, the lowest frequency sub band 6 contains one quarter of the number of data values compared to the number of data values that constituted the original picture 4.

The second stage of decimation takes place only upon the lowest frequency sub band 6 from the first stage of decimation. This lowest frequency sub band 6 is again subject to horizontal and vertical frequency separation. The resulting second stage lowest frequency sub band 8 in this case now contains one sixteenth of the total number of samples compared to the original picture 4. The sub bands 10, 12 and 14 from the first stage of decimation are unaltered.

In the final stage of decimation, the second stage lowest frequency sub band 8 is subject to horizontal and vertical spatial frequency separation to yield four spatial frequency sub bands (0, 1, 2, 3). The other sub bands are left unaltered.

The overall result of this wavelength coding has been to produce ten sub bands. The number of frequency component values in each sub band increases by a factor of 4 between sub bands (0, 1, 2, 3), sub bands (4, 5, 6) and sub bands (7, 8, 9).

The three stage decimation of FIG. 4 has subjected the lowest frequency data to three horizontal stages of frequency separation and three vertical stages of frequency separation. In a generalised case where the lowest frequency sub band has been subjected to N stages of horizontal frequency separation and N stages of vertical frequency separation, then the total number of sub bands that results is given by $3N+1$.

Figure 5:
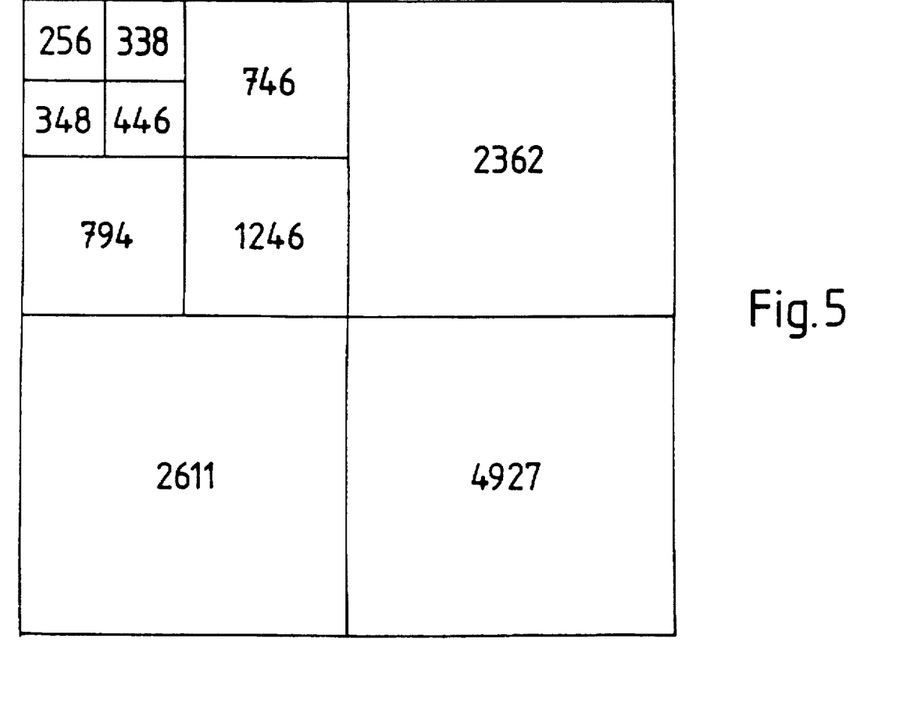
FIG. 5 illustrates a quantisation matrix for use with the spatial frequency sub band output illustrated in FIG. 4.

FIG. 5 illustrates a quantisation matrix for use with the three stage decimation wavelet coded output of FIG. 4. The lower frequency sub bands are subjected to a less severe quantisation than the higher frequency sub bands. Thus, the quantisation step width for the sub band 0 is 256, whereas that for the sub band 9 is 4927, a higher number reflecting more severe quantisation.

Figure 6:
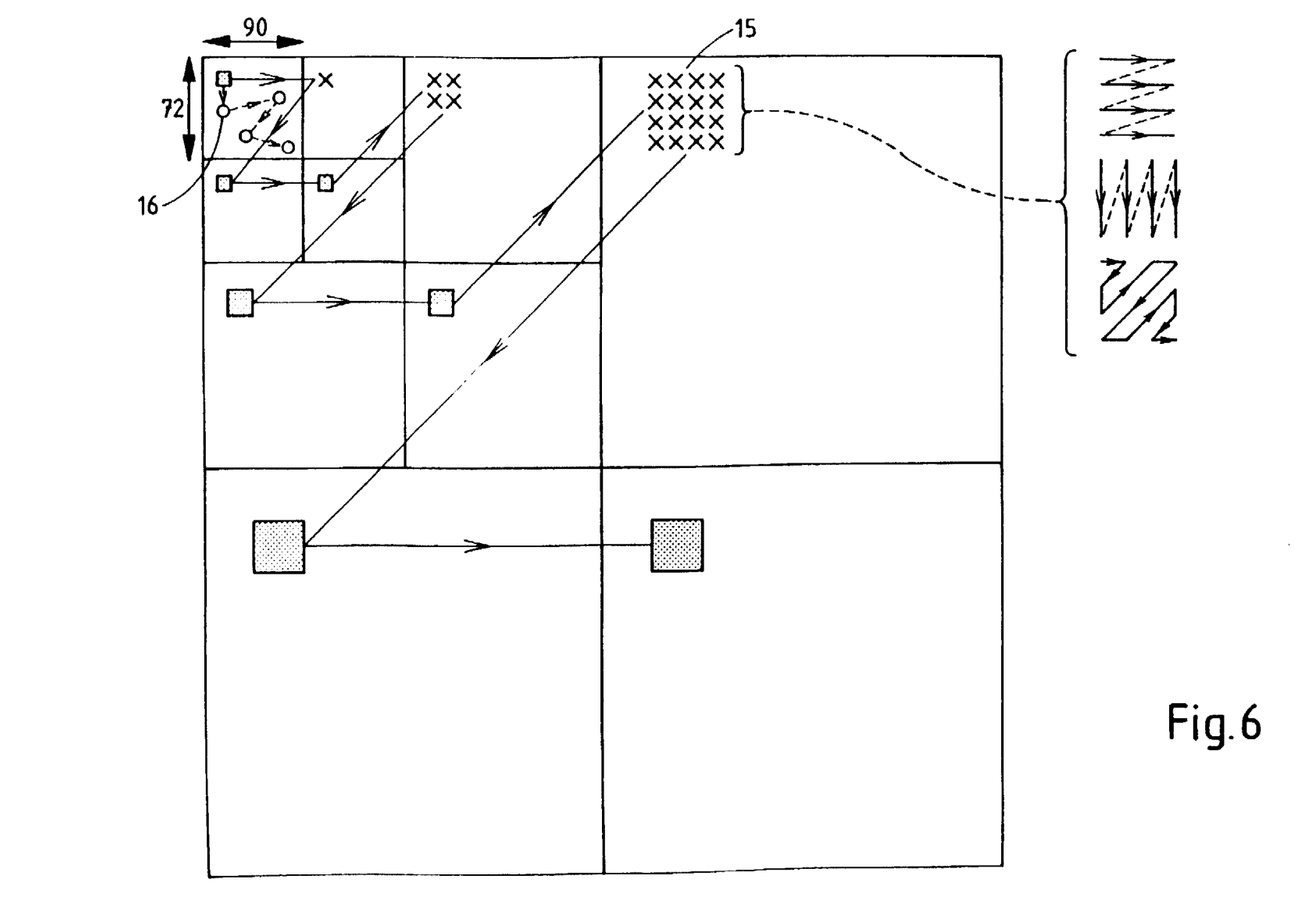
FIG. 6 illustrates a scanning pattern that is repeated through the spatial frequency sub band, output of FIG. 4.

FIG. 6 illustrates one scan of a repeating scanning pattern for the sub band data of FIG. 4. As illustrated, the sub band 0 contains an array of (90*72) frequency coefficient values. In accordance with the frequency separation technique described above, the sub band 5 will contain (180*144) frequency coefficient values and the sub band 8 will contain (360*288) frequency coefficient values. The original source picture size in this example is (720*576).

The scan pattern illustrated progresses by scanning one sample (the upper leftmost sample) from each of sub bands 0 to 3 followed by four samples from the sub bands 5 to 6 and finally sixteen samples from the sub bands 7 to 9. In this way, it will be seen that the number of samples taken from each sub band during the illustrated scan is proportional to the total number of samples within that sub band.

It will be appreciated that whilst the number of samples taken from the sub bands increases progressively from 1 to 4 to 16, the spatial position within the original image represented by these samples corresponds. Thus, if a particular portion of the original image is of low information content, then all of the samples within a scan corresponding to that portion of the image will be likely to be of a low information content and accordingly compress efficiently.

In the sub bands from which more than one sample is taken, the order in which the samples are taken from that sub band can vary. As illustrated for the array of samples 15 taken from sub band 8, these samples can be scanned with a horizontal raster, a vertical raster or a zig-zag pattern. The scan pattern for use within each sub band can vary between sub bands so as to take advantage of the characteristics of that sub band in that it may tend to contain either predominantly vertical patterns, horizontal patterns or diagonal patterns.

The scan illustrated in FIG. 6 is a single scan which is then repeated for different positions. As illustrated by the small circles 16, the subsequent relative positions within each sub band can be chosen to follow a quasi-random pattern which eventually covers all of the samples within all of the sub bands. The advantage of this scanning pattern whereby successive scans are from non adjacent spatial positions is that should an interruption occur in the compressed data stream, the effect upon the reconstructed image will tend to be spread out rather than concentrated in one point. This makes the effect less noticeable and easier to conceal.

The repeating scan patterns are packaged within fixed size blocks for subsequent processing. These blocks may then be provided with error checking and correction codes for that block and may be recorded or stored in a more regular fashion facilitated by the fixed size block structure.

Figure 7:
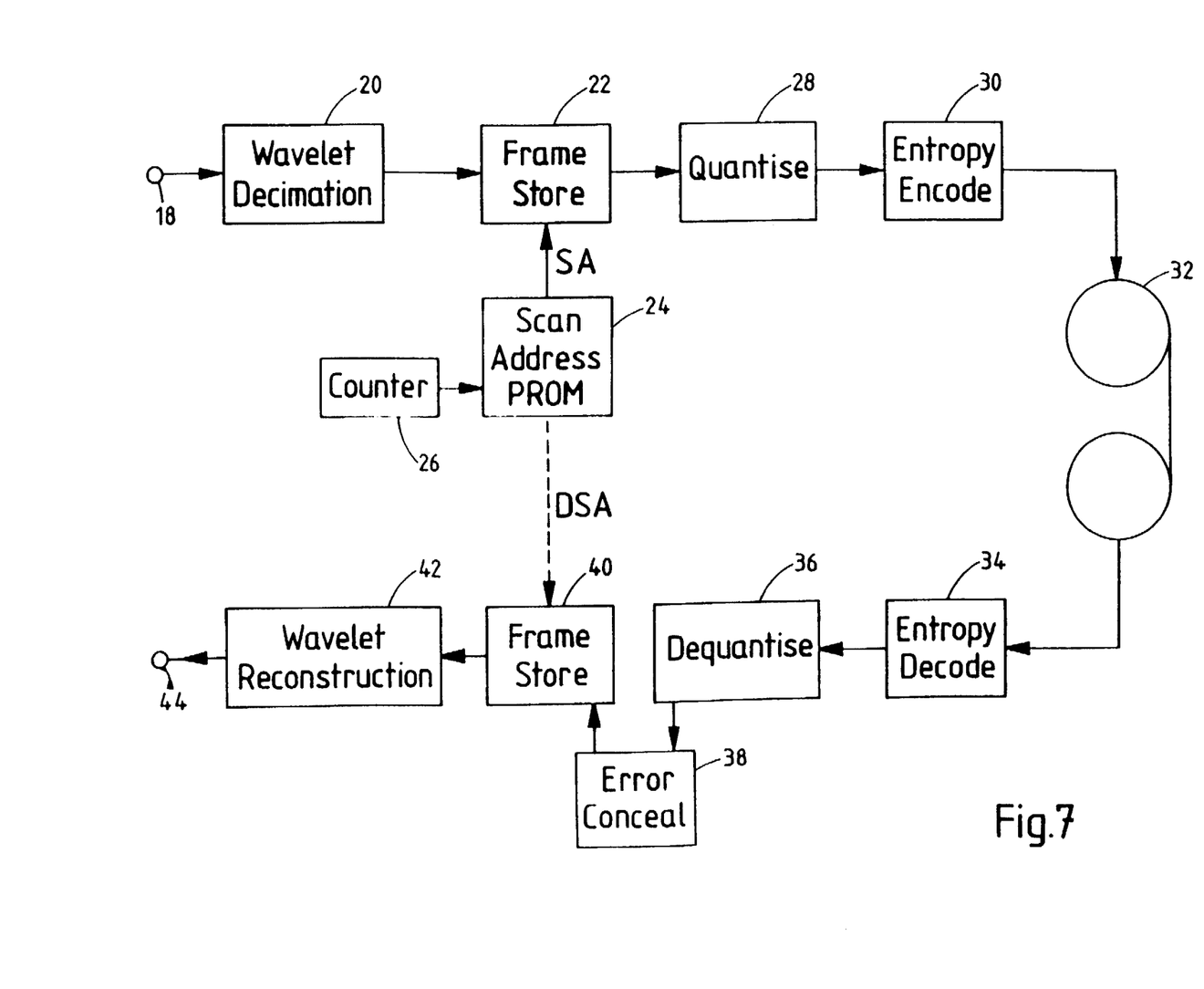
FIG. 7 illustrates a recording and reproducing apparatus utilising data compression and decompression in accordance with an embodiment of the invention.

FIG. 7 illustrates an apparatus for recording and reproducing image data utilising the compression technique illustrated in FIGS. 4 to 6. Image data is input at node 18 to a wavelet decimation unit 20 where it undergoes wavelet decimation into the form illustrated after the third stage of decimation in FIG. 4. The output from the wavelet decimation unit 20 can vary in sequence depending upon the constructional details of the particular implementation of the wavelet decimation unit 20. This variation in sequence can be dealt with by storing the data within a frame store 22. Once a complete spatially transformed image has been collected within the frame store 22 it can be read out with the repeating scan pattern illustrated in FIG. 6 under control of the scan address SA produced by a scan address PROM 24 driven by a counter 26. The scan address PROM 24 is programmed with a sequence of mappings of counter values to frame store addresses following the scanning sequence desired and illustrated in FIG. 6.

The output from the frame store 22 is passed to a quantiser 28 where it is subject to the quantisation in proportion to the step widths illustrated in FIG. 5 in dependence upon from which sub band the data value originates.

The quantised data is then input to an entropy encoding unit 30 where it is subject to runlength and then Huffman coding in accordance with the JPEG or other appropriate technique. The code also includes generating end of block codes to indicate that all the sample from a given position within a scan to the end are zeros.

The compressed data output from the entropy encoder as fixed size blocks is stored upon and then read from a digital video tape unit 32 and passed to an entropy decoder 34 where it is subject to Huffman and then runlength decoding.

The output from the entropy decoder 34 is dequantised by a dequantiser 36 using the inverse of the quantisation matrix illustrated in FIG. 5. An error detection and concealment unit 38 then serves to detect and conceal (e.g. by deriving replacement values from adjacent values) any data that is in error.

The data in the spatial frequency domain is collected together within a frame store 40. The data is read into the frame store 40 under control of a descanning address DSA that is generated by the scan address PROM 24 and corresponds to the sequence of addresses illustrated in FIG. 6. The effect of this is to place the scanned data into the frame store 40 so as to reconstruct the sub band structure illustrated at the third stage of decimation in FIG. 4.

The data in the frame store 40 is then passed to a wavelet reconstruction unit 42 where wavelet decoding is performed to generate image data in the spatial domain at output node 44.

Figures 8, 8A:
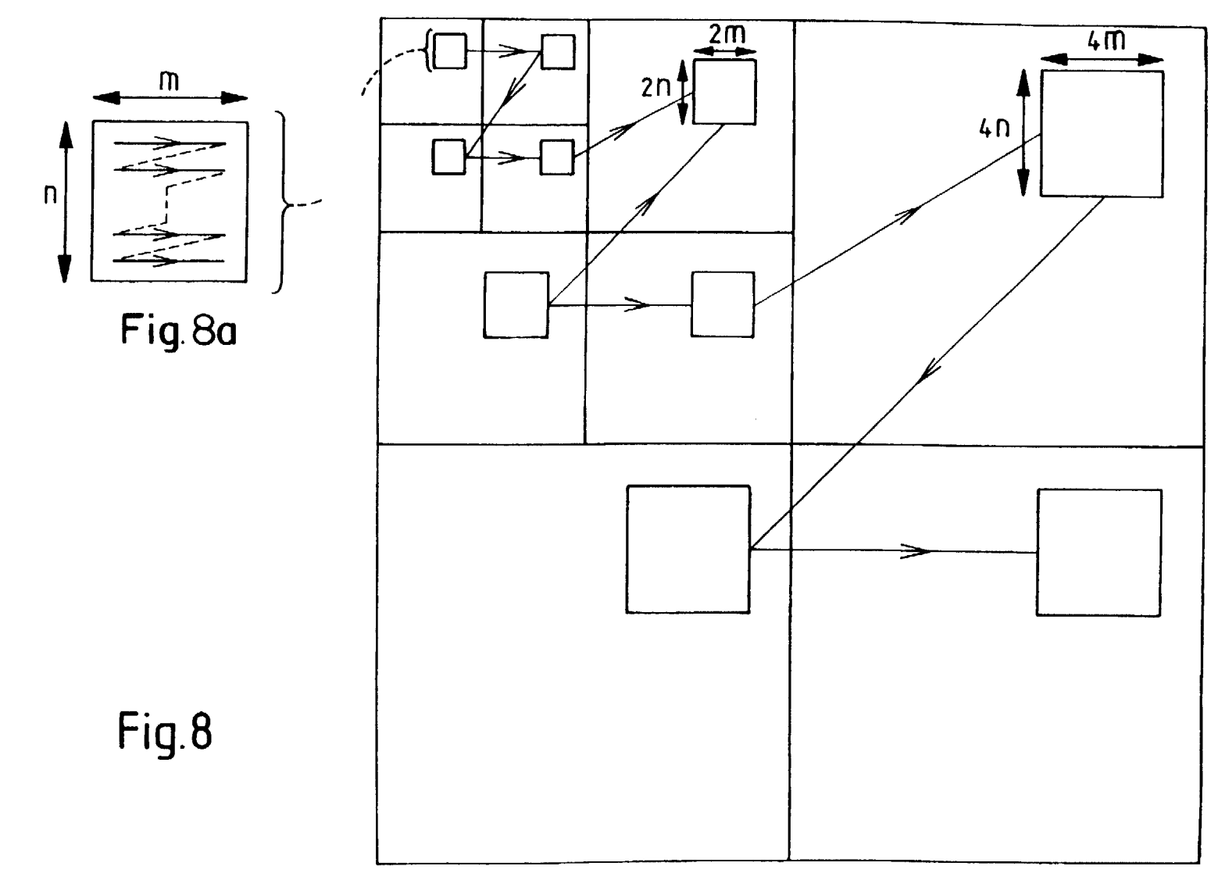
FIG. 8 illustrates an alternative scanning pattern to that illustrated in FIG. 6.

FIG. 8 illustrates an alternative scanning pattern. In this case the number of pixels scanned from each band at one time is larger, (e.g. if m*n pixel values are scanned from the lowest frequency band, then typically this may be 15*12 pixels; the higher frequency band would then have 30*24 and 60*48 pixels). With larger numbers of pixels consecutively coming from each band it becomes advantageous to adapt the entropy coding that will be applied to the data within a scan such that the data from each band is coded in a matched way.

Thus, in the case of JPEG type runlength and Huffman coding of the scan pattern of FIG. 8, data within each scan from each band has its own Huffman coding table, i.e. considering the example above in which 15*12 pixels are taken from the lowest frequency band:

| Source Band | Pixel No. | Scan Position | Coding Table |
| --- | --- | --- | --- |
| 0 | 15*12 | 0 to 179 | 0 |
| 1 | 15*12 | 178 to 359 | 1 |
| 2 | 15*12 | 360 to 539 | 2 |
| 3 | 15*12 | 540 to 719 | 3 |
| 4 | 30*24 | 720 to 1439 | 4 |
| 5 | 30*24 | 1440 to 2159 | 5 |
| 6 | 30*24 | 2160 to 2879 | 6 |
| 7 | 60*48 | 2880 to 5759 | 7 |
| 8 | 60*48 | 5759 to 8639 | 8 |
| 9 | 60*48 | 8639 to 11519 | 9 |

In this case the one scan through the bands produces a 1D string of 11520 pixels and a complete 720*576 pixel image requires 36 such scans to be made to completely read it. Matching the coding table applied to the band from which a segment of data within the string originates can increase the coding efficiency.

Thus, it will be seen that the use of the above described techniques can provide image data compression with an improved degree of compression by matching the nature of the data processing after frequency separation to the manner in which the data has been frequency separated.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for compressing image data, said apparatus comprising:
   (i) means for frequency separating input image data into a plurality of spatial frequency bands, at least some lower spatial frequency bands containing fewer frequency component values than at least some higher spatial frequency bands;
   (ii) means for scanning frequency component values from said plurality of spatial frequency bands with a repeating scan pattern to form a scanned data stream, said scan pattern being such that a number of frequency component values are read from corresponding spatial positions within each given spatial frequency band, said number being proportional to how many frequency component values are in said given spatial frequency band, successive ones of said repeating scanning pattern corresponding to non spatially adjacent positions within said image data; and
   (iii) means for entropy encoding said scanned data stream to form compressed image data.

2. Apparatus for compressing image data, said apparatus comprising:
   (i) means for frequency separating input image data into a plurality of spatial frequency bands, at least some lower spatial frequency bands containing fewer frequency component values than at least some higher spatial frequency bands;
   (ii) means for scanning frequency component values from said plurality of spatial frequency bands with a repeating scan pattern to form a scanned data stream, said scan pattern being such that a number of frequency component values are read from corresponding spatial positions within each given spatial frequency band, said number being proportional to how many frequency component values are in said given spatial frequency band; and (iii) means for entropy encoding said scanned data stream to form compressed image data, said means for entropy encoding including means for generating end of block codes indicating that all further frequency component values within a scan pattern from a current position are zeros.

* * * * *